United States Patent Office 3,081,312
Patented Mar. 12, 1963

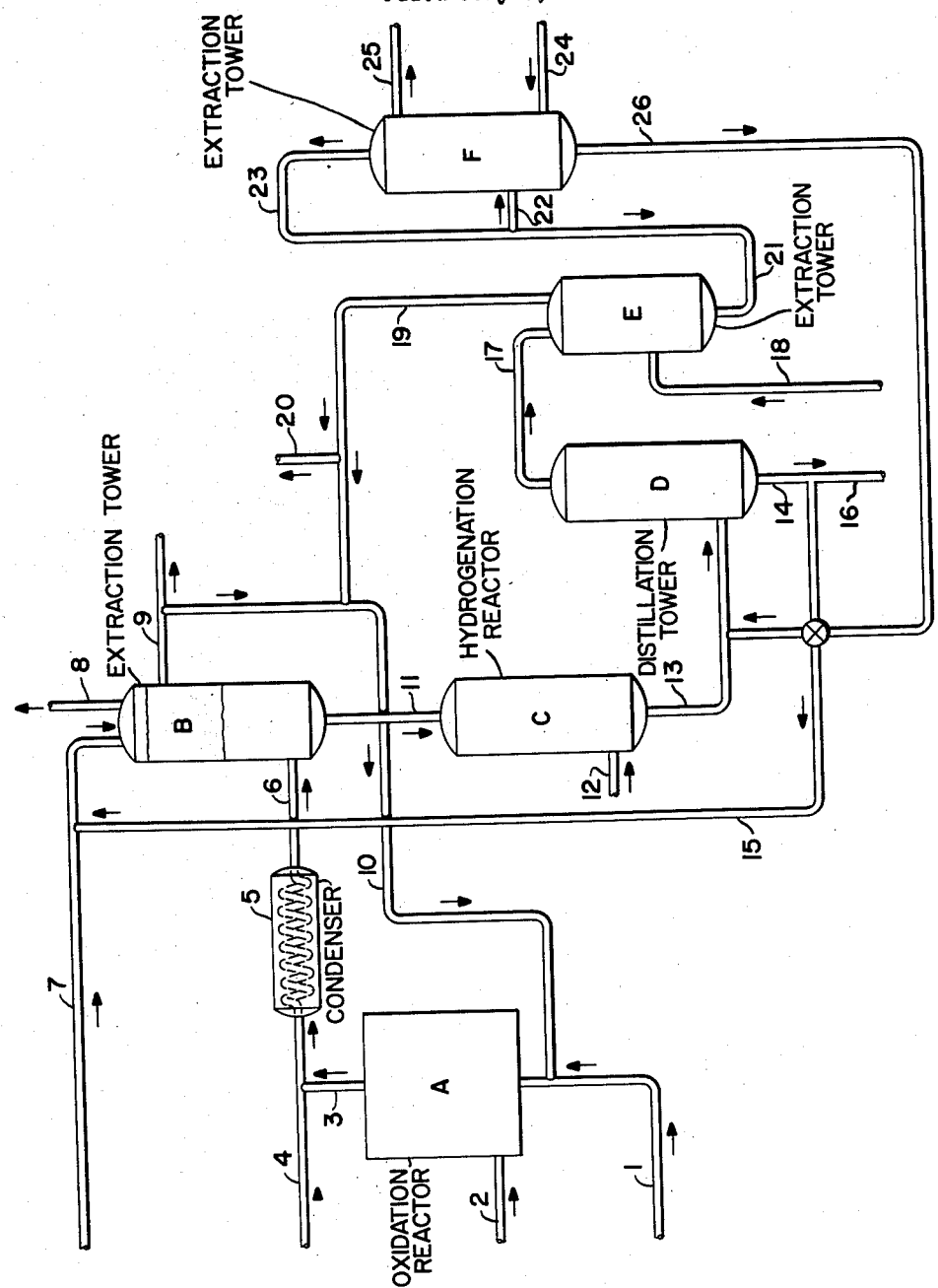

3,081,312
RECOVERY OF OXYGENATED PRODUCTS
Robert B. Long, Wanamassa, and Theodore M. Rosenblatt, Elizabeth, N.J., assignors to Esso Research and Engineering Company, a corporation of Delaware
Filed July 1, 1959, Ser. No. 824,430
9 Claims. (Cl. 260—348.5)

This invention relates to a novel integrated process for the partial oxidation of hydrocarbons and to a process for recovery of valuable compounds from a partial oxidation reaction mixture. In particular this invention relates to the non-catalytic vapor phase partial oxidation of hydrocarbons and to subsequent separation steps permitting the recovery of valuable oxygenated compounds in a form suitable for commercial use.

It is well known that hydrocarbons of various types and molecular weights may be partially oxidized in vapor phase and in the absence of a catalyst to produce a product comprising a complex mixture of cyclic ethers, i.e. epoxides, aldehydes, alcohols, ketones, acids, esters and olefins. It can be readily understood that while the aforenoted products are valuable, such a mixture presents a formidable problem to the chemical producer faced with the separation of the individual components. Such mixtures from partial oxidation processes are usually not valuable products unless separated into the individual components. Thus, one of the more important products from a partial oxidation process insofar as commerce is concerned today is the aldehydic component and its hydrogenated product, the corresponding alcohol.

It has now been found that the desired oxygenated compounds can be separated from the oxidation reaction product mixture by a combination of processing steps which in summary comprise:

(1) Water extraction prior to hydrogenation;
(2) Hydrogenation of the aqueous phases only;
(3) Separation of an oxygenated stream comprising epoxides, alcoholic compounds and small amounts of water; and
(4) Re-extraction of epoxides and separation of alcoholic components.

By the aforesaid combination of steps, there is obtained an alcoholic stream containing minor amounts of water which may be purified by known techniques if desired or which may be employed as an octane improver for gasoline by contact with large volumes of gasoline whereby the alcohol is blended therein by extraction. In such a blending operation essentially none of the water is solubilized in the gasoline.

For an understanding of the present invention, reference will be had to the attached drawing showing a simplified schematic flow plan of the contemplated process.

In the drawing, A represents an oxidation reactor. B represents a water extraction tower comprising baffles, packing or other means for obtaining good liquid-liquid contact. C is a conventional liquid phase hydrogenation reactor which in a preferred embodiment will contain a hydrogenation catalyst bed. D is a conventional distillation tower of a size and with a number of plates commensurate in scope with the throughput rate desired and purity of product contemplated. E represents an extraction tower similar to B, and F represents an extraction tower of a substantially greater size so as to accommodate large quantities of gasoline or other hydrocarbon to permit the blending as indicated below.

In operation, the hydrocarbon feed which may be in liquid phase but is preferably in vapor phase is passed into oxidation reactor A via line 1 and air is admitted via line 2. Conditions within the oxidation reaction zone are generally maintained between 300–900° F. and at a pressure of 0 to 750 p.s.i.g. If desired any of the known initiators such as ozone, various hydroperoxides, triggering agents or the like may be employed. The design of the oxidation reaction zone per se is not an important part of this invention. It may in fact comprise tubular-type reactors surrounded by indirect cooling means to maintain the temperature of this highly exothermic reaction within the range desired. Other types of reactors include the homogeneous reactor wherein the gases are whirled about the reactor at a rapid rate permitting intimate admixture between the oxidizing gas and the hydrocarbon feed for a short contact time. A raining solids reactor wherein the temperature within the reaction zone is controlled by passing cooled finely divided inert solids downwardly through the reactor at a defined rate may also be employed. In general the residence time within the reaction zone will be maintained between 0.01 to 10 seconds and in any event insufficient to cause substantially complete combustion to water and carbon dioxide. As known in the art the oxygen containing gas may consist of oxygen or oxygen admixed with inert gases such as in air. The hydrocarbon feed is admitted into the reactor as a gas and the entire reaction is carried out in a vaporous state.

The hydrocarbon feed may comprise any paraffinic or olefinic hydrocarbon containing at least 5 carbon atoms. While pure or relatively pure hydrocarbons may be employed, in a practical operation, a preferred feed stock would comprise a petroleum fraction containing a number of various hydrocarbons. The paraffinic and olefinic hydrocarbons most generally applicable to this process include normal and branched chain pentanes, pentenes, hexanes, hexenes, heptanes, heptenes, octanes, octenes and the like. These hydrocarbons may be cyclic or acyclic as desired. While the hydrocarbon feed to the oxidation reaction zone may contain some aromatics, there is preferably employed a feed stock having a low aromaticity. With regard to petroleum fractions there may be employed light, medium and heavy naphthas. Light naphthas contain primarily hydrocarbons within the $C_5$–$C_8$ range, medium naphthas comprise hydrocarbons principally in the $C_8$–$C_{10}$ range and heavier naphthas comprise hydrocarbons in the $C_{10}$–$C_{12}$ range. These naphtha fractions may be from virgin stock or from catalytically cracked petroleum fractions. Also amenable but less perferable are the heavier hydrocarbons such as kerosens, gas oil and the like or any heavier fraction capable of being vaporized for oxidation in accordance with this process. Regardless of the feed employed, the products recoverable in accordance with this process will be approximately the same since, as will be specified subsequently, only products obtained in the aqueous phase are used, higher molecular weight water insoluble products being recycled for further partial oxidation. It is to be noted that along with partial oxidation there occurs in the reaction zone a degree of oxidative cracking and dehydrogenation.

The reaction product mixture leaving reactor A via line 3 is contacted with a water quench via line 4 at temperatures below about 200° F. to stop the oxidation reaction and to prevent over-oxidation of the product. The quenched reatcion product mixture now typically containing olefins resulting from oxidative dehydrogenation of paraffins, epoxides containing generally from 4–8 carbon atoms such as dimethyl tetrahydrofuran and the like, aldehydic components having from 1 to 5 carbon atoms per molecule and smaller amounts of alcohols, ketones, acids, esters and aliphatic ethers. After condensation in condenser 5 the liquid reaction product mixture is passed via line 6 into a water extraction tower B which as previously noted will preferably contain baffles suitable for assuring intimate admixture between liquid phases. In tower B there is formed three phases which are from top to bottom a vapor phase representing uncondensable gases, a hydrocarbon phase containing primarily olefins with minor amounts of paraffins, and a substantial amount of higher molecular weight hydrocarbon soluble epoxides. The bottom aqueous phase will comprise the lower molecular weight aldehydes, a minor amount of light epoxides and smaller amounts of other oxygenated products. To this water extraction tower B there is fed vialine 7 from .1 to 5 volumes of water per volume of total liquid feed. Preferably this ratio will be .5 to 2 volumes of water per volume of total liquid feed. The water extraction is shown as a countercurrent system although co-current techniques or other mixing means such as with an orifice type mixer may be employed. The uncondensed gases will be purged overhead via line 8 and the hydrocarbon layer removed via line 9 for recycle to the oxidation reactor via line 10. This recycle stream contains higher molecular weight ($>C_3$) alcohols and aldehydes, and the bulk of the epoxides and these compounds are further oxidized in the reactor to form more water soluble oxygenated compounds, thus increasing the overall yield of light alcohols. By this water extraction step olefins which are valuable as feed to the oxidation reactor and which would normally require substantial amounts of hydrogen in a subsequent hydrogenation step are removed from the system for recycle and further conversion to desired product. The olefins it is known are more easily oxidized to valuable oxygenated products than their corresponding paraffinic compounds. The water extraction in tower B may be carried out at ambient temperatures or if desired at higher or lower temperatures. The aqueous phase from extraction tower B is passed via line 11 to a hydrogenation reaction zone C. Zone C preferably comprises a bed of a strong hydrogenation catalyst such as Raney nickel, copper chromite, molybdenum sulfide, Pt, Pd., and tungsten sulfide. While these catalysts are preferably employed in their skeletal form, they may be supported on known catalyst carriers such as activated charcoal, coke, kieselguhr, alumina or the like.

Hydrogen is fed into hydrogenation zone C via line 12 preferably under pressures of between 500–5000 p.s.i.g. and temperautres within the hydrogenation zone are maintained preferably between 200–500° F., although temperatures exceeding either end of this range may be employed if desired. The entire hydrogenated aqueous phase now containing an appreciable amount of alcohol is taken from the hydrogenation zone via line 13 and passed to a fractionating column D wherein all or substantially all of the alcohols are taken overhead with substantial amounts of water and minor amounts of water soluble epoxides which were extracted in extraction column B. The epoxides were substantially unaffected by the hydrogenation carried out in zone C. From the bottom of fractionating column D there is taken via line 14 water with trace to minor amounts of alcohol. If desired this aqueous phase may be recycled to extraction column V via line 15 for the recovery of additional alcohol. Water may be purged from the system via line 16. The overhead from fractionating column D containing, for example, a major amount of alcohols, 5–15% water and 5–10% epoxides is passed via line 17 to an extraction zone E for contact with small volumes of hydrocarbon fed in via line 18 for the purpose of extracting the remaining epoxy compounds from the fractionator overhead. Preferably and as a matter of convenience this hydrocarbon extraction solvent will comprise at least a portion of the feed stock to the oxidation reactor A. Thus, in operation the extract containing hydrocarbon feed with small amounts of the epoxides is taken overhead via line 19 and fed as epoxide containing hydrocarbon into oxidation reactor A via line 10. Any excess of hydrocarbonoxy extract may be purged or recovered via line 20 for storage and/or future use.

In a modification of this invention the epoxides in the hydrocarbon extract recovered via line 19 may be separated for conversion to other valuable chemical products by any known technique. Epoxides are especially valuable for the preparation of acyclic esters, ethers, alcohols and the like. Trace to minor amounts of the valuable alcohols extracted and recycled to the oxidation reactor via lines 19 and 10; however, the bulk of the desirable alcohols is removed from the extraction column E as an aqueous phase raffinate via line 21. At this point the alcohol may be recovered by any known technique for the separation of alcohols and water. Water extractive distillation is such a process.

To illustrate the utility of this invention with regard to the manufacture of improved octane gasoline compositions, the raffinate stream 21 is shown being fed into a blending extraction column F via line 22, this extraction column having a recycle system 23. In the case of blending the alcohol into gasoline an extremely large excess of gasoline or other hydrocarbon stock is fed into the extraction column via line 24. Preferably in a process of this type from 4 to 20 volumes of gasoline or other hydrocarbon stock is employed per volume of alcohol containing raffinate. The gasoline now having an improved octane rating is recovered via line 25 as extract and aqueous raffinate layer, which may contain residual amounts of alcohol and other oxygenated compounds, is removed from the bottom of the extraction column F via line 26 for recycle to distillation column D or, if some epoxides are present, this aqueous phase may be recycled to the primary water extraction tower B via line 15.

To set forth further specific and general conditions amenable to the present process reference may now be had to the table which follows. It is to be understood that the feed may vary considerably in accordance with the desired product and the conditions shown in Table I with regard to reaction time, pressures, temperatures, etc. will vary depending on the reaction product obtained. While the nature of the total reaction product is, of course, heavily dependent on the feed employed, the composition of the recoverable products in accordance with this invention is dependent on water solubility.

*Table I*

| | Conditions | |
|---|---|---|
| | General | Specific |
| A—Oxidation Reactor: | | |
| Teeperature, °F | 300 to 900 | 600. |
| Pressure (total) p.s.i.g | 0 to 750 | Atmospheric. |
| O²/HC Total Feed Ratio (molar) | .1 to 2.5 | 0.75. |
| Residence Time (seconds) | 0.01 to 10 | 1. |
| B—Extraction Tower: | | |
| Temperature, ° F | Ambient to 150 | Ambient. |
| Pressure, p.s.i.g | 0 to 100 | 20. |
| H²O/Reaction Product (Volumes Ratio) | .5 to 2 | 1. |
| C—Hydrogenation (Raney nickel catalyst bed): | | |
| Residence Time (minutes) | 10 to 60 | 30. |
| Temperature, ° F | 200 to 500 | 300. |
| Pressure (H₂), p.s.i.g | 500 to 1,500 | 1,000. |
| D—Distillation Column | | Atmospheric. |
| E—Re-extraction with Hydrocarbon: | | |
| Temperature, ° F | Ambient to 150 | Ambient. |
| Pressure, p.s.i.g | 0 to 100 | 20. |
| HC/Alcohol Containing Stream (Volume) | 0.1 to 1 | 0.5. |
| F—Blending Extraction Tower: | | |
| Ratio Gasoline to Oxy Product | 4 to 20 | 10. |

The ratio of alcohols to epoxides in the aqueous phase after hydrogenation is of course dependent upon the amount of epoxides and carbonyl compounds obtained during the oxidation reaction. Typically the alcohol to epoxide ratio in the aqueous phase after hydrogenation will be in the order of about 3 to 1. The alcohols will comprise principally methyl, ethyl and some n-propyl and isopropyl alcohol. The epoxides will comprise the various isomers of pentene oxide, heptene oxide and in particular common partial oxidation products such as 2,5- dimethyl tetrahydrofuran, 2,4 and 3,4-dimethyl tetrahydrofuran.

From the above description it is apparent that the present invention provides an integrated oxidation process having considerable value to the industry. While partial oxidation of hydrocarbons has been known for some time, one of the major difficulties in commercializing such processes relates to the recovery of valuable oxygenated products. In general the reaction product mixture from a partial oxidation process such as described above contains not only unreacted hydrocarbons but also a mixture of epoxides, aldehydes, alcohols, ketones, acids, esters, ethers or in general a smear of various oxygenated hydrocarbons. The present process, as is evident, enables one to economically separate the more important oxygenated compounds, viz. aldehydes and alcohols. The water insoluble higher epoxides obtained in the present process are recycled to the oxidation reactor for conversion to other more desirable oxygenated compounds. The lower molecular weight water soluble epoxides after separation of the higher epoxides are subjected to hydrogenation conditions in the presence of carbonyl products, and the resultant hydrogenated products containing some epoxides are after distillation re-extracted with hydrocarton such as the hydrocarbon feed at a ratio sufficient to remove substantially all of the remaining water soluble epoxides. The desired alcohols are then preferably extracted or blended with large volumes of gasoline to produce a high octane product. In lieu of the blending technique the alcohol may be freed or substantially freed of water to obtain a relatively pure product. It is seen that the combination of steps set forth herein present a versatile system for recovery of desirable products from a smear of oxidation products resulting from partial oxidation of hydrocarbons.

What is claimed is:

1. A process for the production of oxygenated compounds which comprises partially oxidizing in a reaction zone a hydrocarbon containing feed comprising paraffins and olefins having at least 5 carbon atoms to form a reaction product mixture containing aldehydes and epoxides, at least some of said aldehydes and epoxides being water soluble, extracting said water soluble aldehydes and epoxides from said reaction product mixture with water leaving a hydrocarbon phase, recycling the hydrocarbon phase to the reaction zone, subjecting the water phase to hydrogenation conditions to convert said aldehydes to alcohols, fractionating the hydrogenated water phase to obtain a stream containing a major amount of alcohol and minor amounts of water and epoxides, and extracting epoxides from said stream with a hydrocarbon to obtain an extract containing said epoxides and a raffinate comprising alcohol having a reduced amount of epoxides.

2. A process in accordance with claim 1 wherein said alcohols in said raffinate are extracted with gasoline to produce a gasoline having an improved octane rating.

3. In a process for producing and recovering valuable oxygenated compounds wherein a hydrocarbon feed having at least 5 carbon atoms is partially oxidized in a reaction zone in vapor phase at a temperature between 300–900° F. for a time sufficient to produce substantial quantities of oxygenated compounds including olefins, aldehydes, alcohols and epoxides, and wherein said alcohols are recovered, the improvement which comprises contacting in a water extraction zone the reaction product mixture from said reaction zone with sufficient water to extract water soluble aldehydes, alcohols and epoxides in an aqueous phase, separating from said water extraction zone a hydrocarbon phase containing water insoluble epoxides and olefins and recycling said hydrocarbon phase to said reaction zone, hydrogenating said aqueous phase to obtain an aqueous mixture of water soluble alcohols and epoxides, separating an alcohol stream containing minor amounts of water and epoxides, contacting said alcohol comprising stream with a portion of the hydrocarbon feed in an extraction zone to extract at least a substantial portion of the epoxides in said alcohol stream to thereby obtain a hydrocarbon extract containing epoxides and an alcohol stream containing a reduced amount of epoxides.

4. A process in accordance with claim 3 wherein said hydrocarbon phase containing epoxides is recycled to said reaction zone.

5. A process in accordance with claim 3 wherein said hydrocarbon phase containing epoxides is separated into epoxides and a hydrocarbon stream substantially free of epoxides.

6. A process in accordance with claim 3 wherein said alcohol comprising stream containing a reduced amount of epoxides is further purified by extractive distillation to obtain a substantially pure alcohol stream.

7. A process in accordance with claim 3 wherein said alcohol comprising stream containing a reduced amount of epoxides is contacted with a gasoline fraction in amounts sufficient to blend said alcohol into said gasoline fraction.

8. A process for the production of oxygenated compounds which comprises partially oxidizing in a reaction zone a hydrocarbon feed comprising $C_5$ to $C_{12}$ paraffins and olefins at a temperature from 300 to 800° F. with oxygen 0.01 to 10 seconds to form a reaction product mixture containing olefins, aldehydes and epoxides, at least some of said aldehydes and epoxides being water soluble, extracting said water soluble aldehydes and epoxides from said product mixture with .5 to 2 volumes of water per volume of product mixture leaving a hydrocarbon phase, recycling the hydrocarbon phase to the reaction zone, subjecting the water phase formed by the water extraction of the product mixture to hydrogenation at temperatures of 200–500° F. and under hydrogen pressure of 500 to 1500 p.s.i.g. to convert said aldehydes to alcohols, fractionating said hydrogenated water phase to recover a stream containing a major amount of methyl, ethyl and propyl alcohols and minor amounts of water and epoxides, and extracting the epoxides from the stream with a portion of the hydrocarbon feed to obtain an extract containing the epoxides and a raffinate comprising the alcohols having a reduced amount of epoxides.

9. A process for the production of oxygenated compounds which comprises partially oxidizing in a reaction zone a hydrocarbon feed comprising $C_5$ to $C_8$ paraffins and olefins at about 600° F. with oxygen in a molar ratio of oxygen to hydrocarbon feed of about 1 to form a reaction product mixture containing olefins, aldehydes and epoxides at least some of said aldehydes and epoxides being water soluble, extracting said water soluble aldehydes and epoxides from said reaction product mixture with leaving a hydrocarbon phase, recycling said hydrocarbon phase to the reaction zone, subjecting the water phase formed by the water extraction of the product mixture to hydrogenation at a temperature at about 300° F., at a hydrogen pressure of about 1000 p.s.i.g. to convert said aldehydes to alcohols, fractionating said hydrogenated water phase to obtain a stream containing a major amount of methyl, ethyl and propyl alcohols and minor amounts of water and epoxides, and extracting epoxides from said streams with a portion of the hydrocarbon feed to obtain an extract containing said epoxides and a raffinite comprising the alcohols essentially free of epoxides.

References Cited in the file of this patent

UNITED STATES PATENTS

| | | |
|---|---|---|
| 2,048,662 | Luther et al. | July 21, 1936 |
| 2,151,106 | Hentrich et al. | Mar. 21, 1939 |
| 2,533,620 | Polly | Dec. 12, 1950 |
| 2,580,528 | Dice et al. | Jan. 1, 1952 |
| 2,610,977 | Gallo | Sept. 16, 1952 |
| 2,725,344 | Fenske et al. | Nov. 29, 1955 |
| 2,750,398 | Courter et al. | June 12, 1956 |